US008923259B2

(12) United States Patent
Ganapathy

(10) Patent No.: US 8,923,259 B2
(45) Date of Patent: Dec. 30, 2014

(54) COMMUNICATION SYSTEM

(75) Inventor: Suresh Ganapathy, Leatherhead (GB)

(73) Assignee: NEC Corporation, Tokyo (JP)

( * ) Notice: Subject to any disclaimer, the term of this patent is extended or adjusted under 35 U.S.C. 154(b) by 405 days.

(21) Appl. No.: 13/260,298

(22) PCT Filed: Apr. 19, 2010

(86) PCT No.: PCT/JP2010/057304
§ 371 (c)(1),
(2), (4) Date: Sep. 24, 2011

(87) PCT Pub. No.: WO2010/123128
PCT Pub. Date: Oct. 28, 2010

(65) Prior Publication Data
US 2012/0020346 A1 Jan. 26, 2012

(30) Foreign Application Priority Data

Apr. 20, 2009 (GB) .................................. 0906818.0

(51) Int. Cl.
*H04W 36/00* (2009.01)
*H04W 36/10* (2009.01)
*H04W 4/22* (2009.01)
*H04W 76/00* (2009.01)
*H04W 84/04* (2009.01)

(52) U.S. Cl.
CPC .......... *H04W 36/0033* (2013.01); *H04W 36/10* (2013.01); *H04W 4/22* (2013.01); *H04W 76/007* (2013.01); *H04W 84/045* (2013.01)
USPC .......................................... 370/338; 370/471

(58) Field of Classification Search
CPC ..... H04W 80/04; H04W 88/06; H04W 84/18; H04W 36/18; H04W 36/0033; H04W 36/10; H04W 4/22; H04W 76/007; H04W 84/045; H04L 12/66
USPC ......... 370/310, 328, 329, 331, 338, 351, 389, 370/400, 401, 431, 432, 464, 465, 470, 370/471; 455/403, 422.1, 436, 440
See application file for complete search history.

(56) References Cited

U.S. PATENT DOCUMENTS

2006/0172738 A1* 8/2006 Kwon et al. ................... 455/439
2007/0036109 A1* 2/2007 Kwak et al. ................... 370/331
(Continued)

FOREIGN PATENT DOCUMENTS

CN 1787685 A 6/2006
CN 101330734 A 12/2008
(Continued)

OTHER PUBLICATIONS

International Search Report (ISR) (PCT Form PCT/ISA/210) dated Nov. 5, 2010, previously filed on Sep. 24, 2011.
(Continued)

*Primary Examiner* — Obaidul Huq
(74) *Attorney, Agent, or Firm* — McGinn IP Law Group, PLLC

(57) ABSTRACT

A communication system including macro and femto cells in which, during relocation of a mobile device from a source macro/femto cell to a target femto cell, mobile device capability, registration cause, and/or mobile device identity information available at the base station of the source macro/femto cell prior to relocation is made available to the home base station and gateway device of the target femto cell.

4 Claims, 8 Drawing Sheets

(56) References Cited

U.S. PATENT DOCUMENTS

| | | | |
|---|---|---|---|
| 2010/0093351 A1* | 4/2010 | Barrett et al. | 455/436 |
| 2010/0112980 A1* | 5/2010 | Horn et al. | 455/411 |
| 2010/0142488 A1 | 6/2010 | Zhang et al. | |
| 2010/0157943 A1* | 6/2010 | Horn | 370/331 |
| 2011/0177814 A1* | 7/2011 | Buchmayer et al. | 455/435.1 |
| 2011/0281584 A1* | 11/2011 | Sander et al. | 455/436 |

FOREIGN PATENT DOCUMENTS

| | | |
|---|---|---|
| CN | 101370266 A | 2/2009 |
| WO | WO 2008/134281 A2 | 11/2008 |
| WO | WO 2009/022976 A1 | 2/2009 |
| WO | WO 2009/034076 A2 | 3/2009 |

OTHER PUBLICATIONS

"Digital cellular telecommunications system (Phase 2+); Universal Mobile Telecommunications System (UMTS); LTE; Handover procedures (3GPP TS 23.009 version 8.1.0 Release 8); ETSI TS 123 009" ETSI Standard, European Telecommunications Standards Institute (ETSI), Sophia Antipolis Cedex, France, vol. 3-CN1, No. V8.1.0, Mar. 1, 2009, XP014043868.

Korean Office Action dated Apr. 17, 2013.

3GPP TSG RAN WG3 TSGW3#7(99)B70 (Sep. 24, 1999).

British Search Report dated Jul. 15, 2009.

R2-071529; 3GPP TSG RAN WG2#57bis; Mar. 26-30, 2007 "Mobile and Access Control Requirements for LTE Home-eNodeB"; St. Julian's, Malta; China Mobile, NTT DoCoMo, Orange, Telecom Italia, Vodafone Group.

Samsung: "3G HNB to 3G Handover" 3GPP Draft; R3-090856, $3^{rd}$ Generation Partnership Project (3GPP), Mobile Competence Centre; 650, Route Des Lucioles; F-06921 Sophia-Antipolis Cedex; France, No. Seoul, Korea; Mar. 19, 2009, XP050341228.

"Universal Mobile Telecommunications System (UMTS); UTRAN Iu interface Radio Access Network Application Part (RANAP) signalling (3GPP TS 25.413 version 8.2.1 Release 8); ETSI TS 125 413" ETSI Standard, European Telecommunication Standards Institute (ETSI), Sophia Antipolis Cedex, France, vol. 3-R3, No. V8.2.1, Apr. 1, 2009, XP014044011.

Panasonic: "UE access cntorol in CSG cell", 3GPP Draft; R2-082238_UE Access Control in CSG Cell, $3^{rd}$ Generation Partnership Project (3GPP), Mobile Competence Centre; 650, Roupte Des Lucioles; F-06921 Sophia-Antipolis Cedex; France vol. RAN WG2, No. Kansas City, USA; Apr. 29 2008, XP050140005.

Airvana: "Indication of UE Identity in the Relocation Request" 3GPP Draft; R3-090776_Draft_CR_25.413_Connected_Mode_Access_Control, $3^{rd}$ Generation Partnership Project (3GPP), Mobile Competence Centre; 650, Route Des Lucioles; F-06921 Sophia-Antipolis Cedex; France No. Seoul, Korea; Mar. 18, 2009, XP050341162.

NEC: "Transfer of UE Identity from" 3GPP Draft; R3-092961_Transfer of UE Identity From Source to Target HNB, $3^{rd}$ Generation Partnership Project (3GPP), Mobile Competence Centre; 650, Route Des Lucioles; F-06921 Sophia-Antipolis Cedex; France, No. Jeju; Nov. 9, 2009, XP050392436.

NEC: "Transfer of UE Identity from" 3GPP Draft; R3-092962_Transfer of UE Identity From Source to Target HNB Correction_Rel 9, $3^{rd}$ Generation Partnership Project (3GPP), Mobile Competence Centre; 650, Route Des Lucioles; F-06921 Sophia-Antipolis Cedex; France, No. Jeju; Nov. 9, 2009, XP050392437.

Section 9.1.3 of 3GPP TS 25.467 v. 8.1.0.

Section 9.1.3 of 3GPP TS 25.468 v. 8.1.0.

Section 9.2.21 of 3GPP TS 25.469 v 8.1.0.

Section 14.12.4.2 of 3GPP TS 25.331 version 8.6.0.

Chinese Office Action dated Jan. 6, 2014 with an English translation.

* cited by examiner

COMMUNICATION SYSTEM

TECHNICAL FIELD

The present invention relates to mobile telecommunication networks, particularly but not exclusively networks operating according to the (3$^{rd}$ Generation Partnership Project) 3GPP standards or equivalents or derivatives thereof. The invention has particular although not exclusive relevance to relocation between base stations and more specifically relocation to a home base station from a home or other base station.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HNB to refer to any such home base station and will use the term NodeB generically to refer to other base stations (such as the base station for the macro cell in which a HNB operates). The HNB will provide radio coverage (for example, 3G/4G/WiMAX) within the home and will connect to the core network via a suitable public network (for example via an ADSL link to the Internet) and in the case of the 3GPP standards, via an optional HNB gateway (HNB-GW) which typically will aggregate traffic from several HNBs.

Typically, when initiating a call, user equipment (UE) such as a mobile telephone (MT) or other mobile communications device (MCD) will register either with a HNB or a NodeB based on, for example, the ability of that HNB/NodeB to support the call relative to other HNBs/NodeBs in the vicinity. Once the call is initiated, it sometimes becomes necessary to relocate the call to another HNB/NodeB due to a change in the relative ability of the original HNB/NodeB to continue to support the call, for example as a result of a change in the location of the UE or other factors which affect the quality of service offered by the original HNB/NodeB. In the case of HNB to HNB relocation, the relocation may also require a change in the serving HNB-GW (Inter-HNB-GW relocation). When a UE is constantly moving (for example when it is located in a moving vehicle) relocation can occur several times during a single call.

The HNB may be configured to operate using one of a plurality of access modes, namely: 'closed' in which the HNB operates as a closed subscriber group (CSG) cell; 'hybrid' in which the HNB operates as a CSG cell where at the same time, non-CSG members are allowed access (for example, to allow preferential treatment of CSG members); and 'open' in which the HNB operates as a normal (non-CSG) cell.

During the initial UE registration procedure access control is performed by the HNB-GW in dependence on the CSG capability of the UE. In the case of non-CSG equipment (e.g. pre-release 8 user equipment), according to the current version of the relevant standard (3GPP TS 25.467 V8.0.0), access control during registration is mandatorily perfointed at the HNB-GW, and optionally at the HNB. In the case of CSG equipment (e.g. release 8 user equipment), the access control mechanism at the HNB-GW always accepts UE registration and subsequent access control is performed by the core network.

In the case of an inter-HNB-GW relocation (e.g. of a CSG UE), after the relocation the new source HNB-GW has no means to determine whether or not access control should be performed for a subsequent relocation. Accordingly, access control may not be performed correctly.

Furthermore, if access control is performed by the new source HNB-GW (for example, as for a non-CSG UE) during relocation, and it is established that the target HNB is configured to operate in a closed access mode, the HNB-GW will reject access, potentially resulting in the call being dropped. This is very undesirable if the original call is an emergency call.

It is currently a requirement in 3GPP for relocation requests (e.g. the RANAP RELOCATION REQUEST) to include an International Mobile Subscriber Identity (IMSI) (e.g. in the 'Permanent NAS UE Identity' information element) for the UE for which relocation is requested. However, a UE registered with a HNB may identify itself using a choice of several identities including an IMSI, a Temporary Mobile Subscriber Identity (TMSI), a Packet Temporary Mobile Subscriber Identity (P-TMSI), an International Mobile Equipment Identity (IMEI), etc. Accordingly, after relocation there is a danger that the UE identity as linked to the original context may be lost.

Catering for NodeB to HNB ('macro-to-femto') relocation and HNB to HNB (femto-to-femto) relocation therefore presents a number of challenges, in particular for access control, and especially in the case of Inter-HNB-GW relocation.

DISCLOSURE OF INVENTION

Although for efficiency of understanding for those of skill in the art, the invention will be described in detail in the context of a 3G system, the principles of the invention can be applied to other systems (such as WiMAX) in which mobile devices or User Equipment (UE) communicate with one of several base stations with the corresponding elements of the system changed as required.

Accordingly, preferred embodiments of the present invention aim to address one or more of the above issues by providing a mechanism via which at least one of UE capability, UE identity, and/or registration cause may be made available to the target HNB and/or the target HNB-GW at the onset of relocation.

According to one aspect of the present invention there is provided a method performed by a gateway device via which a home base station is connected in a communication network, the method comprising: receiving a relocation request message indicating that relocation of a mobile communication device to the home base station has been triggered, the relocation request message including, in a form extractable by the gateway device, at least one of: information identifying a capability of the mobile communication device to support membership of a closed subscriber group (CSG); and information identifying a cause of registration of the mobile communication device in the communication network; and extracting from the relocation request message the at least one of: the information identifying the capability of the mobile communication device to support membership of a closed subscriber group (CSG); and the information identifying the cause of registration of the mobile communication device in the communication network.

The relocation request message may include, in a form extractable by the gateway device, both (or just one of): the information identifying the capability of the mobile communication device to support membership of a closed subscriber group (CSG); and the information identifying the cause of registration of the mobile communication device in the communication network.

The relocation request message may includes the information identifying the capability of the mobile communication device to support membership of the closed subscriber group (CSG) in an encoded form; and the information identifying the cause of registration of the mobile communication device in the communication network in a form extractable by the target gateway device. The method may further comprise: communicating the relocation request message to the target home base station; may comprise receiving, from the target home base station, a reply message including the information identifying the capability of the mobile communication device to support membership of the closed subscriber group (CSG) in a form extractable by the gateway device; and may comprise extracting, from the reply message, the information identifying the capability of the mobile communication device to support membership of a closed subscriber group (CSG).

According to another aspect of the present invention there is provided a method performed by a gateway device via which a target home base station is connected in a communication network, the method comprising: receiving a relocation request message indicating that relocation of a mobile communication device to the target home base station has been triggered, the relocation request message including, in an encoded form, at least one of: information identifying a capability of the mobile communication device to support membership of a closed subscriber group (CSG); and information identifying a cause of registration of the mobile communication device in the communication network; communicating the relocation request message to the target home base station; receiving, from the target home base station, a reply message including, in a form extractable by the gateway device, the at least one of: information identifying a capability of the mobile communication device to support membership of a closed subscriber group (CSG); and information identifying a cause of registration of the mobile communication device in the communication network; and extracting, from the reply message, the at least one of: information identifying a capability of the mobile communication device to support membership of a closed subscriber group (CSG); and information identifying a cause of registration of the mobile communication device in the communication network.

The relocation request message may include, in an encoded form, both (or one of): the information identifying the capability of the mobile communication device to support membership of the closed subscriber group (CSG); and the information identifying the cause of registration of the mobile communication device in the communication network.

The relocation request message may includes: the information identifying the capability of the mobile communication device to support membership of a closed subscriber group (CSG) in an encoded form; and may include the information identifying the cause of registration of the mobile communication device in the communication network in a form extractable by the target gateway device. The method may further comprise extracting, from the relocation request message, the information identifying the cause of registration of the mobile communication device in the communication network.

According to another aspect of the present invention there is provided a method performed by a target home base station in a communication network, the method comprising: receiving, from a target gateway device, a relocation request message indicating that relocation of a mobile communication device to the target home base station has been triggered, the relocation request message including, in an encoded form, at least one of: information identifying a capability of the mobile communication device to support membership of a closed subscriber group (CSG); and information identifying a cause of registration of the mobile communication device in the communication network; extracting, from the relocation request message, the encoded information; generating a reply message including, in a form extractable by the target gateway device, the extracted information; and communicating the reply message to the target gateway device.

The relocation request message may include, in an encoded form, both (or one of): the information identifying a capability of the mobile communication device to support membership of a closed subscriber group (CSG); and the information identifying a cause of registration of the mobile communication device in the communication network.

The relocation request message may includes: the information identifying the capability of the mobile communication device to support membership of a closed subscriber group (CSG) in an encoded form; and may include the information identifying the cause of registration of the mobile communication device in the communication network in a form extractable by the target gateway device.

According to another aspect of the present invention there is provided a method performed by a communication node via which a mobile communication device is connected in a communication network, the method comprising: determining that relocation of the mobile communication device has been triggered; generating, in response the determination that relocation has been triggered, a relocation required message, the relocation required message including at least one of: information identifying a capability of the mobile communication device to support membership of a closed subscriber group (CSG); and information identifying a cause of registration of the mobile communication device in the communication network; and communicating the relocation required message to a further communication node of the communication network.

The generating step may comprise generating the relocation required message to include the at least one of: information identifying a capability of the mobile communication device to support membership of a closed subscriber group (CSG); and information identifying a cause of registration of the mobile communication device in the communication network; in a form extractable by a gateway device.

The generating step may comprise generating the relocation required message to include the at least one of: the information identifying the capability of the mobile communication device to support membership of a closed subscriber group (CSG); and the information identifying the cause of registration of the mobile communication device in the communication network; in a Radio Network Controller (RNC) message.

The RNC message may be a Source Radio Network Controller (RNC) to Target Radio Network Controller (RNC) transparent container.

The method may be performed by a home base station.

The generating step may comprise generating the relocation required message to include the at least one of: information identifying a capability of the mobile communication device to support membership of a closed subscriber group (CSG); and information identifying a cause of registration of the mobile communication device in the communication network; in an encoded four.

The generating step may comprise generating the relocation required message to include the at least one of: information identifying a capability of the mobile communication device to support membership of a closed subscriber group (CSG); and information identifying a cause of registration of the mobile communication device in the communication network; encoded in a Radio Resource Control (RRC) message.

The RRC message may comprise a Serving Radio Network Subsystem (SRNS) Relocation Information message.

The method may be performed by a radio network controller.

The generating step may comprise generating, in an encoded form, the relocation required message to include information identifying a capability of the mobile communication device to support membership of a closed subscriber group (CSG).

According to another aspect of the present invention there is provided a method performed by a gateway device via which a home base station is connected in a communication network, the method comprising: receiving a relocation required message indicating that relocation of a mobile communication device has been triggered, the relocation required message including at least one of: information identifying a capability of the mobile communication device to support membership of a closed subscriber group (CSG); and information identifying a cause of registration of the mobile communication device in the communication network; and communicating the relocation required message to a communication device in a core network of the communication network.

According to another aspect of the present invention there is provided a method performed by a communication device of a core network in a communication network, the method comprising: receiving a relocation request message indicating that relocation of a mobile communication device has been triggered, the relocation request message including, in encoded form, information identifying a capability of the mobile communication device to support membership of a closed subscriber group (CSG); generating a relocation request message, based on the relocation required message, the relocation request message including the encoded information and, in a form extractable by a gateway device, information identifying a cause of registration of the mobile communication device in the communication network; and communicating the relocation request message to a target gateway device.

According to another aspect of the present invention there is provided a gateway device for connection to by a home base station in a communication network, the gateway device comprising: means for receiving (e.g. a receiver) a relocation request message indicating that relocation of a mobile communication device to the home base station has been triggered, the relocation request message including, in a form extractable by the gateway device, at least one of: information identifying a capability of the mobile communication device to support membership of a closed subscriber group (CSG); and information identifying a cause of registration of the mobile communication device in the communication network; and means for extracting (e.g. an extractor/processor) from the relocation request message the at least one of: the information identifying the capability of the mobile communication device to support membership of a closed subscriber group (CSG); and the information identifying the cause of registration of the mobile communication device in the communication network.

The relocation request message may include, in a form extractable by the gateway device, both (or one of): information identifying a capability of the mobile communication device to support membership of a closed subscriber group (CSG); and information identifying a cause of registration of the mobile communication device in the communication network.

The relocation request message may include: the information identifying the capability of the mobile communication device to support membership of the closed subscriber group (CSG) in an encoded form; and may include the information identifying the cause of registration of the mobile communication device in the communication network in a form extractable by the target gateway device. The gateway device may further comprise: means for communicating the relocation request message to the target home base station; means for receiving (e.g. a receiver), from the target home base station, a reply message including the information identifying the capability of the mobile communication device to support membership of the closed subscriber group (CSG) in a form extractable by the gateway device; and means for extracting (e.g. an extractor/processor), from the reply message, the information identifying the capability of the mobile communication device to support membership of a closed subscriber group (CSG).

According to another aspect of the present invention there is provided a gateway device for connection to by a home base station in a communication network, the gateway device comprising: means for receiving (e.g. a receiver) a relocation request message indicating that relocation of a mobile communication device to the target home base station has been triggered, the relocation request message including, in an encoded form, at least one of: information identifying a capability of the mobile communication device to support membership of a closed subscriber group (CSG); and information identifying a cause of registration of the mobile communication device in the communication network; means for communicating the relocation request message to the target home base station; means for receiving (e.g. a receiver), from the target home base station, a reply message including, in a form extractable by the gateway device, the at least one of: information identifying a capability of the mobile communication device to support membership of a closed subscriber group (CSG); and information identifying a cause of registration of the mobile communication device in the communication network; and means for extracting (e.g. an extractor/processor), from the reply message, the at least one of: information identifying a capability of the mobile communication device to support membership of a closed subscriber group (CSG); and information identifying a cause of registration of the mobile communication device in the communication network.

The relocation request message may include, in an encoded form, both (or one of): the information identifying a capability of the mobile communication device to support membership of the closed subscriber group (CSG); and the information identifying the cause of registration of the mobile communication device in the communication network.

The relocation request message may include: the information identifying the capability of the mobile communication device to support membership of a closed subscriber group (CSG) in an encoded form; and the information identifying the cause of registration of the mobile communication device in the communication network in a form extractable by the target gateway device. The gateway device may further comprise means for extracting (e.g. an extractor/processor), from the relocation request message, the information identifying the cause of registration of the mobile communication device in the communication network.

According to another aspect of the present invention there is provided a home base station for connection in a communication network, the home base station comprising: means for receiving (e.g. a receiver), from a target gateway device, a relocation request message indicating that relocation of a mobile communication device to the home base station has been triggered, the relocation request message including, in an encoded form, at least one of: information identifying a capability of the mobile communication device to support membership of a closed subscriber group (CSG); and information identifying a cause of registration of the mobile communication device in the communication network; means for extracting (e.g. an extractor/processor), from the relocation request message, the encoded information; means for generating (e.g. a generator/message generator) a reply message including, in a form extractable by the target gateway device, the extracted information; and means for communicating the reply message to the target gateway device.

The relocation request message may include, in an encoded form, both (or one of): information identifying a capability of the mobile communication device to support membership of a closed subscriber group (CSG); and information identifying a cause of registration of the mobile communication device in the communication network.

The relocation request message may include: the information identifying the capability of the mobile communication device to support membership of a closed subscriber group (CSG) in an encoded form; and the information identifying the cause of registration of the mobile communication device in the communication network in a form extractable by the target gateway device.

According to another aspect of the present invention there is provided a communication node for connection via which a mobile communication device is connectable in a communication network, the communication node comprising: means for determining (e.g. a determiner) that relocation of the mobile communication device has been triggered; means for generating (e.g. a generator/message generator), in response the determination that relocation has been triggered, a relocation required message, the relocation required message including at least one of: information identifying a capability of the mobile communication device to support membership of a closed subscriber group (CSG); and information identifying a cause of registration of the mobile communication device in the communication network; and means for communicating the relocation required message to a further communication node of the communication network.

The generating means may be configured for generating the relocation required message to include the at least one of: information identifying a capability of the mobile communication device to support membership of a closed subscriber group (CSG); and information identifying a cause of registration of the mobile communication device in the communication network; in a form extractable by a gateway device.

The generating means may be configured for generating the relocation required message to include the at least one of: information identifying a capability of the mobile communication device to support membership of a closed subscriber group (CSG); and information identifying a cause of registration of the mobile communication device in the communication network; in a Radio Network Controller (RNC) message.

The RNC message may be a Source Radio Network Controller (RNC) to Target Radio Network Controller (RNC) transparent container.

A home base station may comprise the determining, generating, and communicating means.

The generating means may be configured for generating the relocation required message to include the at least one of: information identifying a capability of the mobile communication device to support membership of a closed subscriber group (CSG); and information identifying a cause of registration of the mobile communication device in the communication network; in an encoded fog in.

The generating means may be configured for generating the relocation required message to include the at least one of: information identifying a capability of the mobile communication device to support membership of a closed subscriber group (CSG); and information identifying a cause of registration of the mobile communication device in the communication network; encoded in a Radio Resource Control (RRC) message.

The RRC message may comprise a Serving Radio Network Subsystem (SRNS) Relocation Information message.

A radio network controller (RNC) may comprise the determining, generating, and communicating means.

The generating means may be configured for generating, in an encoded form, the relocation required message to include information identifying a capability of the mobile communication device to support membership of a closed subscriber group (CSG).

According to another aspect of the present invention there is provided a gateway device for connection to by a home base station in a communication network, the gateway device comprising: means for receiving (e.g. a receiver) a relocation required message indicating that relocation of a mobile communication device has been triggered, the relocation required message including at least one of: information identifying a capability of the mobile communication device to support membership of a closed subscriber group (CSG); and information identifying a cause of registration of the mobile communication device in the communication network; and means for communicating the relocation required message to a communication device in a core network of the communication network.

According to another aspect of the present invention there is provided communication device for forming part of a core network in a communication network, the communication device comprising: means for receiving (e.g. a receiver) a relocation request message indicating that relocation of a mobile communication device has been triggered, the relocation request message including, in encoded form, information identifying a capability of the mobile communication device to support membership of a closed subscriber group (CSG); means for generating (e.g. a generator/message generator) a relocation request message, based on the relocation required message, the relocation request message including the encoded information and, in a form extractable by a gateway device, information identifying a cause of registration of the mobile communication device in the communication network; and means for communicating the relocation request message to a target gateway device.

Other Exemplary Features

Transfer of the relocation request and/or relocation required messages (e.g. between the gateway device and home base station and/or vice versa) may be achieved by generating a transfer message for transporting the relocation request message, and communicating the relocation request/required message to the recipient (e.g. home base station/gateway device in the transfer message. The transfer message may comprise a RANAP User Application (RUA) message, for example a RUA Direct Transfer message or a RUA Connect message.

The relocation request message may comprise a Radio Access Network Application Part (RANAP) Relocation Request message.

The information identifying whether the mobile communication device supports membership of the CSG may comprises a 'UE Capability' information element/information element group, may comprise a 'CSG Capability' information element, may comprise a 'UE radio access capability' information element/information element group, and/or may comprise a 'Support of CSG' information element.

The information identifying whether said mobile communication device supports a CSG may comprise information identifying a release version of the mobile communication device for example an access stratum release indicator.

The information identifying the cause of registration of the mobile communication device may comprise information identifying whether the registration was caused by an emergency call and/or may comprise a 'Registration Cause' information element/information element group.

The relocation request and/or relocation required messages may include information identifying the mobile communication device for which relocation has been triggered. The information identifying the mobile communication device for which relocation has been triggered may comprise an information element/information element group providing for a plurality of different forms of identification. The plurality of different forms of identification may include any of an International Mobile Subscriber Identity (IMSI) (e.g. in the 'Permanent NAS UE Identity' information element) for the UE for which relocation is requested, a Temporary Mobile Subscriber Identity (TMSI), a Packet Temporary Mobile Subscriber Identity (P-TMSI), an International Mobile Equipment Identity (IMEI). The information element/information element group may comprise a 'UE Identity' element/group.

According to another aspect of the present invention there is provided a method performed by a gateway device via which a home base station is connected in a communication network, the method comprising: receiving a relocation required message indicating that relocation of a mobile communication device has been triggered, the relocation required message including information upon which a decision can be based as to how and whether to perform access control; and communicating the relocation required message to a communication device in a core network of the communication network.

The information upon which a decision can be based as to how and whether to perforin access control may comprise at least one of: information identifying a capability of the mobile communication device to support membership of a closed subscriber group (CSG); and information identifying a cause of registration of the mobile communication device in the communication network.

The relocation required message may comprise a Radio Access Network Application Part (RANAP) Relocation Required message.

The invention provides, for all methods disclosed, corresponding computer programs or computer program products for execution on corresponding equipment, the equipment itself (user equipment, nodes or components thereof) and methods of updating the equipment. The computer programs may be provided on a recording medium such as a CD-ROM or the like.

BRIEF DESCRIPTION OF THE DRAWINGS

Embodiments of the invention will now be described, by way of example, with reference to the accompanying drawings in which.

MODE FOR CARRYING OUT THE INVENTION

Overview

Figure 1:
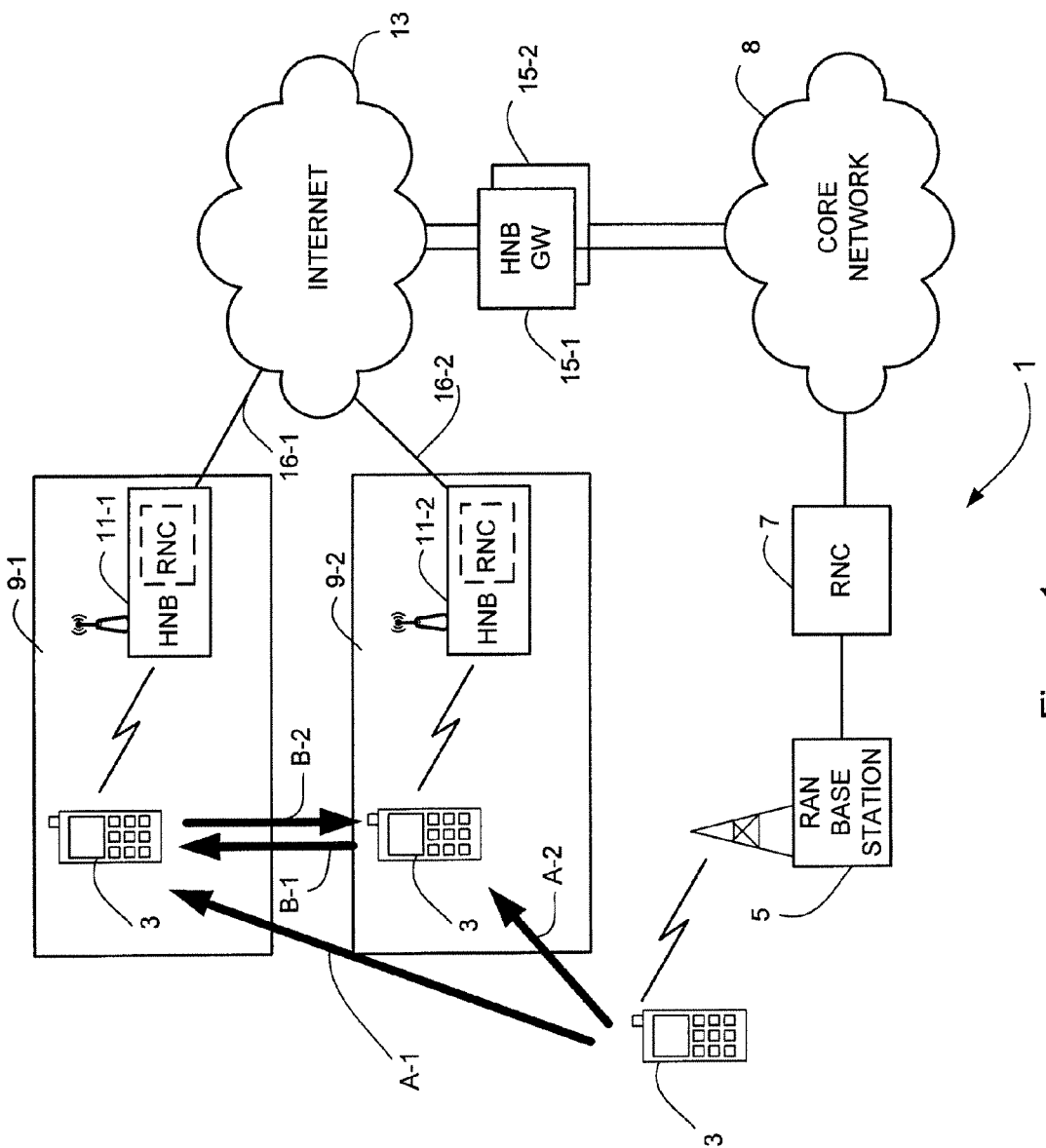
FIG. 1 schematically illustrates a mobile telecommunication system of a type to which the embodiments are applicable.

FIG. 1 schematically illustrates a mobile (cellular) telecommunication system 1 in which a user of a mobile telephone (MT) 3 can communicate with other users (not shown) via a macro cell of a 3G Radio Access Network (RAN) base station 5, a Radio Network Controller (RNC) 7 and a core telephone network 8 when the user is away from any of a plurality of 'home' base station (HNB) based cells 9-1, 9-2 (generally 9), which he may be permitted to access. In the telecommunication system 1 the user may also communicate with the other users (not shown) via the cell 9-1, 9-2 of a respective HNB 11-1, 11-2 (generally 11), a public data network (in this case the Internet 13), a respective home base station gateway (HNB-GW) 15-1, 15-2 (generally 15), and the core telephone network 8 when the user is within one of the HNB based cells 9-1, 9-2. Each HNB 11-1, 11-2 will typically connect to the respective HNB-GW 15-1, 15-2 via a suitable Internet connection such as an ADSL or cable connection 16-1, 16-2 (generally 16) and is programmed with the IP address of the respective HNB-GW 15-1, 15-2 so that all uplink communications are transmitted via the respective HNB-GW 15-1, 15-2. As those skilled in the art will appreciate, each HNB 11-1, 11-2 can communicate with a number of different mobile telephones 3. It will be further appreciated that there may be any number of HNB based cells 9 and that the same HNB-GW 15 may be shared by a plurality of HNBs 11.

The telecommunication system 1 is configured to support mobility between cells including relocation A-1, A-2 of the UE from the macro cell to one of the HNB based cells 9-1, 9-2 (and vice versa), and relocation B-1, B-2 from one HNB based cells 9-1, 9-2 to another.

Mobile Telephone

Figure 2:
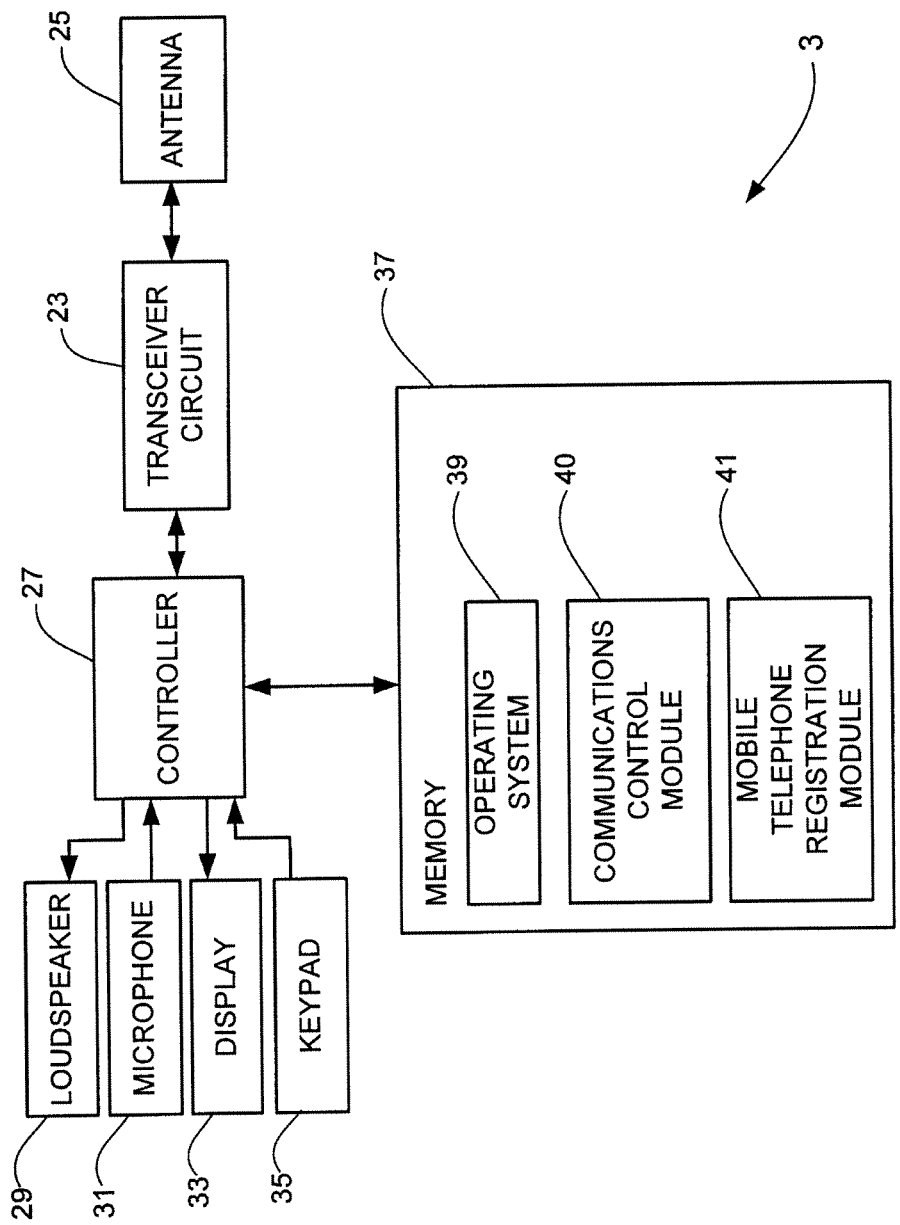
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the RAN base station 5 or the HNB 11 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a communications control module 40, and a mobile telephone registration module 41. The communications control module 40 controls the communications with the HNB 11 and the mobile telephone registration module 41 selects the home base station 11 when the mobile telephone 3 is within range of their HNB 11. The selection may be automatic or manually controlled by the user.

During initial registration with the HNB 11, the mobile telephone registration module 41 generates registration information for communication to the HNB using appropriate signalling, including information identifying: the mobile telephone's identity (e.g. its International Mobile Subscriber Identity (IMSI), a Temporary Mobile Subscriber Identity (TMSI), a Packet Temporary Mobile Subscriber Identity (P-TMSI), and/or the like); the mobile telephone's capabilities (e.g. its access stratum release indicator and/or its closed subscriber group capabilities); and the reason for registration to the HNB (e.g. whether the call is an emergency call or not).

Radio Network Controller

Figure 3:
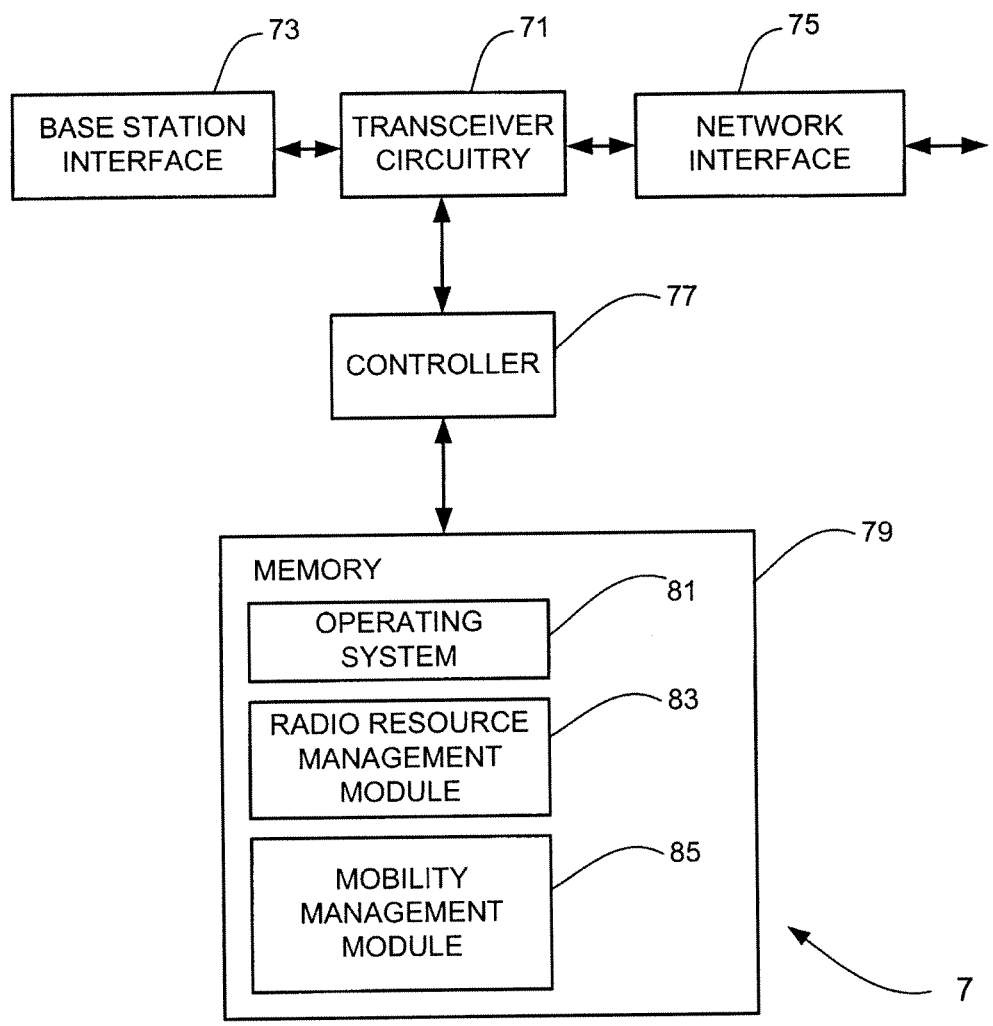
FIG. 3 is a block diagram of a radio network controller forming part of the system shown in FIG. 1.

FIG. 3 is a block diagram illustrating the main components of the RNC 7 shown in FIG. 1. The RNC 7 includes a transceiver circuit 71, which is operable to transmit signals to and to receive signals from the base station 5 via a base station interface 73 and which is operable to transmit signals to and receive signals from the rest of the telephone network via a network interface 75. A controller 77 controls the operation of the transceiver circuit 71 in accordance with software stored in memory 79. The software includes, among other things, an operating system 81, a radio resource management module 83 for carrying out radio resource management functions, and a mobility management module 85 for managing relocation of a mobile telephone 3 from the macro cell of the base station 5 via which it is connected to the cell of another base station (e.g. the cell 9 of the associated HNB 11) and vice versa.

It will be appreciated that the functions of the RNC 7 could be integrated with the base station 5 to allow the base station to incorporate the radio resource management functions of the RNC 7 in a single communications node.

Home Base Station

Figure 4:
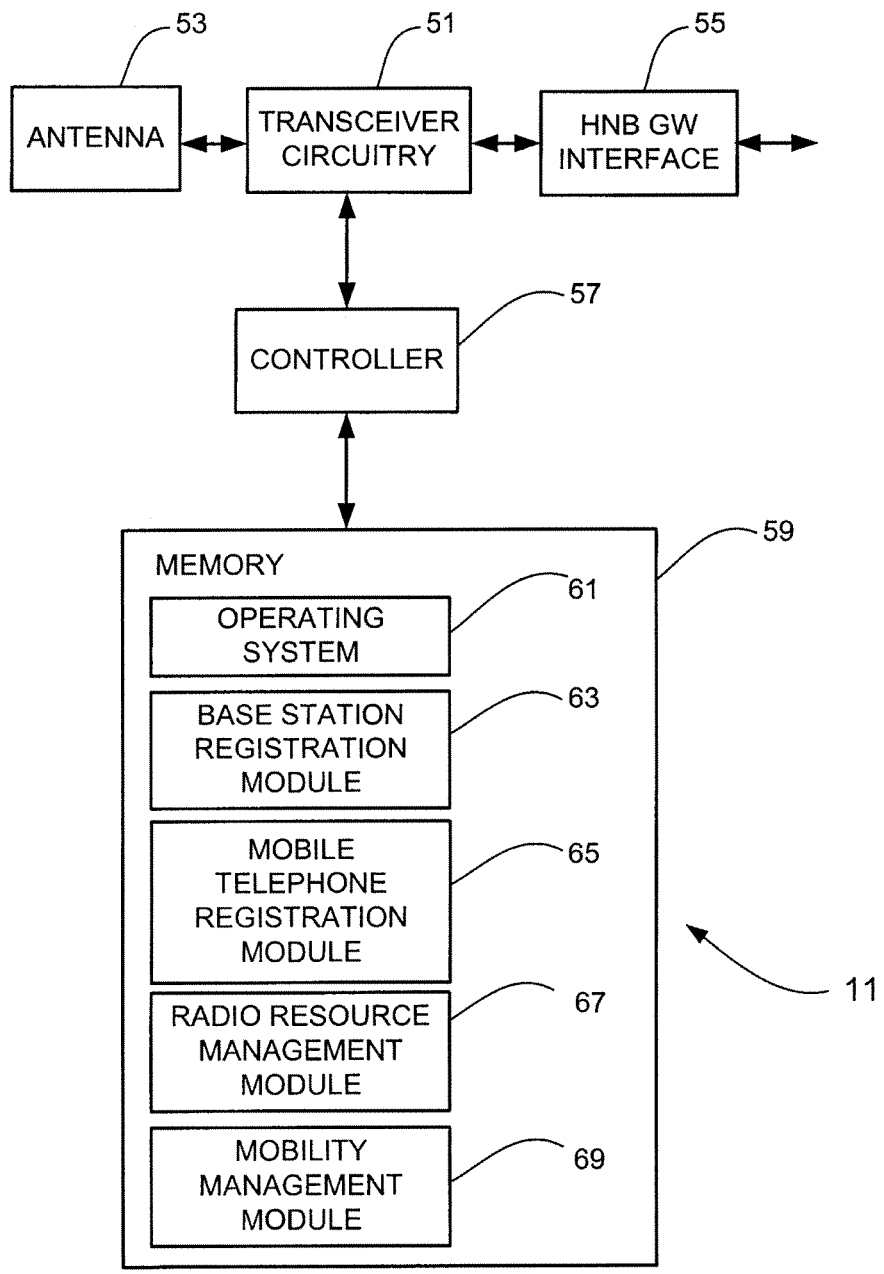
FIG. 4 is a block diagram of a home base station forming part of the system shown in FIG. 1.

FIG. 4 is a block diagram illustrating the main components of the home base station (HNB) 11 shown in FIG. 1. As shown, the HNB 11 includes transceiver circuitry 51 which is operable to transmit signals to, and to receive signals from, the mobile telephone 3 via one or more antennae 53 and which is operable to transmit signals to and to receive signals from the HNB-GW 15 via a HNB-GW interface 55. The operation of the transceiver circuitry 51 is controlled by a controller 57 in accordance with software stored in memory 59. The software includes, among other things, an operating system 61, a base station registration module 63, a telephone registration module 65, radio resource management module 67, and a mobility management module 69. The base station registration module 63 is operable to register the HNB with the HNB-GW 15 and the mobile telephone registration module 65 is operable to register the mobile telephone 3 with itself and with the HNB-GW 15, including the provision of appropriate registration information including, for example, the mobile telephone's identity, its capabilities, and the reason for registration to the HNB. The radio resource management module 67 is operable to control communications between the HNB 11 and the mobile telephone 3 and in particular to carry out the radio resource management functions normally associated with a RNC (e.g. similar to those of the RNC 7 of FIG. 1) including, for example, the encoding and decoding of radio resource control (RRC) messages. It will be appreciated that these functions may be provided separately in a dedicated RNC. The mobility management module 69 is operable to manage relocation of a mobile telephone 3 from the cell 9 of the associated HNB 11 to the cell of another base station (e.g. another cell 9 associated with another HNB 11 or a macro cell), and vice versa, including both intra-HNB-GW relocation to a HNB 11 connected to the same HNB-GW 15 and inter-HNB-GW to a HNB 11 connected to a different HNB-GW 15.

HNB Gateway

Figure 5:
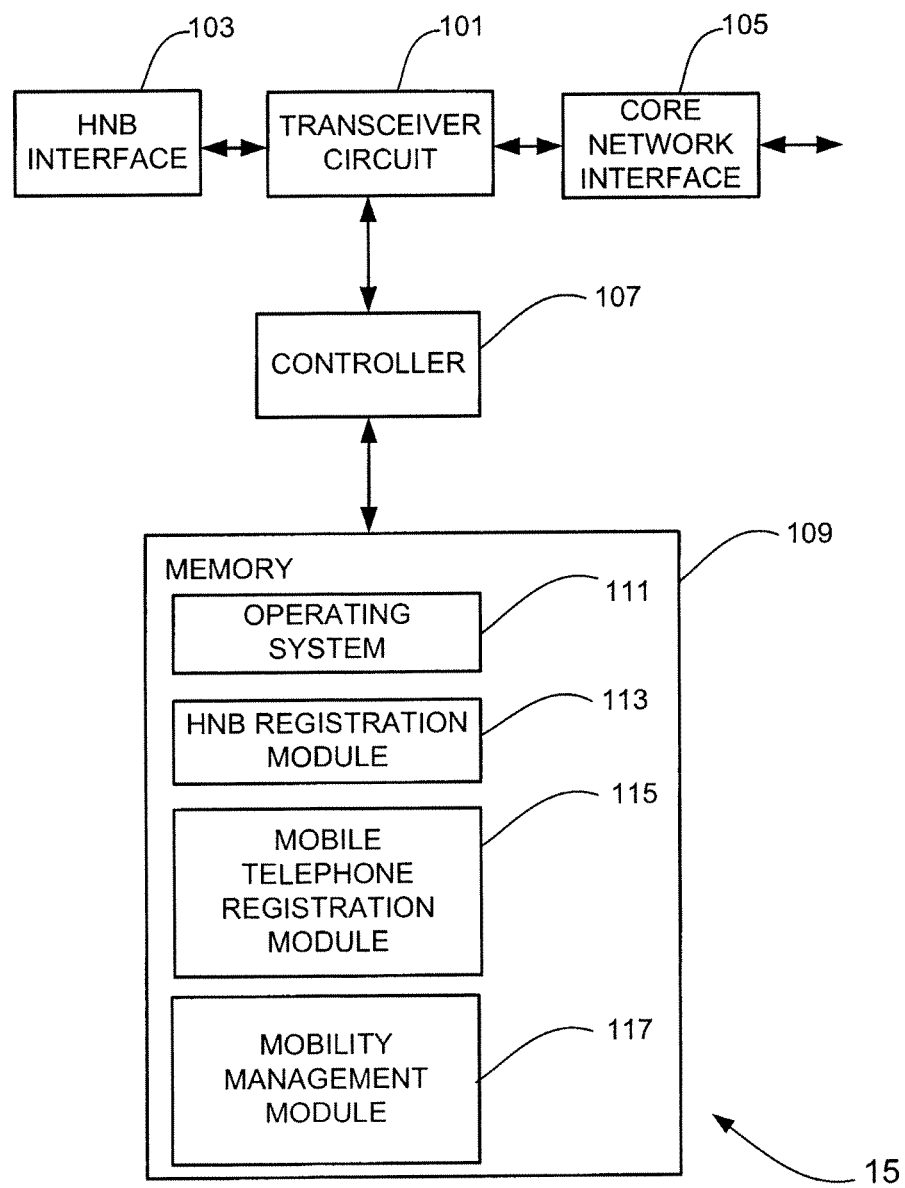
FIG. 5 is a block diagram of a home base station gateway forming part of the system shown in FIG. 1.

FIG. 5 is a block diagram illustrating the main components of the HNB gateway (HNB-GW) 15 shown in FIG. 1. As shown, the HNB-GW 15 includes a transceiver circuit 101 which is operable to transmit signals to, and to receive signals from, the HNB 11 via the HNB interface 103 and which is operable to transmit signals to and to receive signals from the core network 8 via a core network interface 105. The operation of the transceiver circuit 101 is controlled by a controller 107 in accordance with software stored in memory 109. The software includes, among other things, an operating system 111, an HNB registration module 113, a mobile telephone registration module 115, and a mobility management module 117. The HNB registration module 113 is operable to control the registration of the HNB 11 and the mobile telephone registration module 115 is operable to control the registration of the mobile telephone 3 and to perform access control as required. The mobility management module 117 is operable to manage relocation from one cell to another and in particular: intra-HNB-GW relocation of a mobile telephone 3 from a cell 9 of an HNB 11 connected via the HNB-GW 15 to a cell 9 of a HNB connected via a different HNB-GW, and vice versa; and relocation of a mobile telephone 3 from a cell 9 of an HNB 11 connected via the HNB-GW 15 to a macro cell, and vice versa.

In the above description, the mobile telephone 3, the RNC 7, the home base station 11, and the HNB-GW 15 are described for ease of understanding as having a number of discrete modules (such as the communications control and the parameter control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Exemplary Implementations

Exemplary implementations will now be described, by way of example, with reference to the operation of the various components of the telecommunication system 1 illustrated in FIG. 1 and the timing diagrams of FIGS. 6 to 8.

Figure 6:
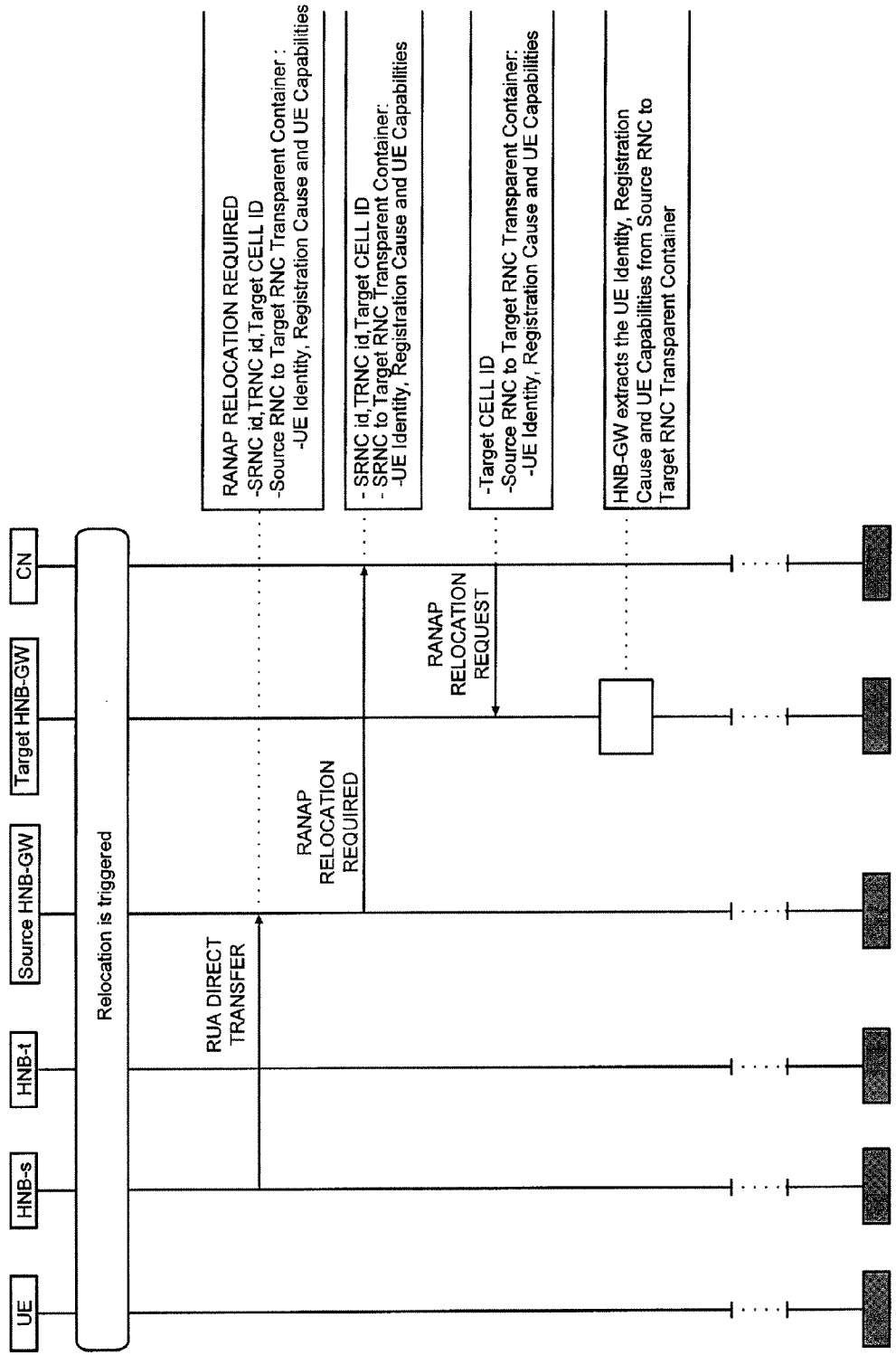
FIG. 6 is a timing diagram illustrating a relocation procedure carried out by an exemplary implementation of the system of FIG. 1.

(1) Femto-to-Femto Relocation—Use of Source RNC to Target RNC Transparent Container FIG. 6, illustrates the operation of an exemplary implementation of the telecommunication system 1 of FIG. 1 during inter-HNB-GW relocation.

In accordance with the implementation shown in FIG. 6, mobility management module 69 of each HNB 11 (when operating as a source HNB) is operable, when relocation is triggered, to manage generation of a transfer message for transferring a relocation required message to the source HNB-GW 15.

Any suitable transfer message may be generated incorporating any suitable relocation required message. For example, the transfer message may be a RANAP User Adaptation (RUA) message (for example, a RUA DIRECT TRANSFER message as referred to in Section 9.1.4 of 3GPP TS 25.413 v. 8.2.1 or variation thereof—see Table 1) and the relocation required message may be a Radio Access Network Application Part (RANAP) RELOCATION REQUIRED MESSAGE (e.g. as referred to in Section 9.1.9 of 3GPP TS 25.413 v. 8.2.1 or variation thereof).

TABLE 1

RUA DIRECT TRANSFER
(sent by the HNB/HNB-GW to the HNB-GW/HNB to transport a RANAP message)

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| CN Domain ID | M | | 9.2.6 | | YES | reject |
| Context ID | M | | 9.2.2 | | YES | reject |
| RANAP Message | M | | 9.2.5 | | YES | reject |

The mobility management module 69 is operable to include a plurality of information elements (IE) and/or IE groups in the relocation required message including:

(a) information identifying the source and target RNCs (respectively part of the source and target HNBs in the described implementations) and the target cell (e.g. SRNC id, TRNC id and Target CELL ID);

(b) information identifying the mobile telephone's identity (e.g. its International Mobile Subscriber Identity (IMSI), a Temporary Mobile Subscriber Identity (TMSI), a Packet Temporary Mobile Subscriber Identity (P-TMSI), and/or the like) (e.g. the IE/IE Group 'UE Identity' referred to in Section 9.2.17 of 3GPP TS 25.469 v 8.1.0 or a variation thereof—see Table 2 below);

(c) information identifying the mobile telephone's capabilities (e.g. its access stratum release indicator and/or its closed subscriber group capabilities) (e.g. the IE/IE Group 'UE Capabilities' referred to in Section 9.2.24 of 3GPP TS 25.469 v 8.1.0 or a variation thereof—see Table 3 below); and (d) information identifying the reason for registration to the HNB (e.g. whether the call is an emergency call or not) (e.g. the IE/IE Group 'Registration Cause' referred to in Section 9.2.21 of 3GPP TS 25.469 v 8.1.0 or a variation thereof—see Table 4 below).

The information identifying the mobile telephone's capabilities and the information identifying the reason for the original registration each constitute information based upon which a HNB-GW 15 can determine whether and/or how access control should be carried out for the identified mobile telephone 3.

TABLE 2

UE Identity (unique identifier for the UE)

| IE/Group Name | Presence | Range | IE type and reference | Semantics description |
|---|---|---|---|---|
| CHOICE UE Identity | | | | |
| IMSI | | | 9.2.10 | |
| TMSI and LAI (GSM-MAP) | | | | |
| TMSI | M | | 9.2.19 | |
| LAI | M | | 9.2.20 | |
| P-TMSI and RAI (GSM-MAP) | | | | |
| P-TMSI | M | | 9.2.22 | |
| RAI (GSM-MAP) | M | | 9.2.23 | |

TABLE 2-continued

UE Identity (unique identifier for the UE)

| IE/Group Name | Presence | Range | IE type and reference | Semantics description |
|---|---|---|---|---|
| IMEI | | | 9.2.18 | |
| ESN (DS-41) | | | BIT STRING (SIZE (32)) | |
| IMSI (DS-41) | | | OCTET STRING (SIZE (5 . . . 7)) | |
| IMSI and ESN (DS-41) | | | | |
| ESN (DS-41) | M | | BIT STRING (SIZE (32)) | |
| IMSI (DS-41) | M | | OCTET STRING (SIZE (5 . . . 7)) | |
| TMSI (DS-41) | | | OCTET STRING (SIZE (2 . . . 17)) | |

TABLE 3

UE Capabilities (Identifies UE capabilities and release)

| Information Element/Group name | Presence | Range | Type and reference | Semantics description |
|---|---|---|---|---|
| UE Capabilities | | | | |
| Access Stratum Release Indicator | M | | Enumerated {R99, Rel-4, Rel-5, Rel-6, Rel-7, Rel-8, ...} | Values as defined in [10] |
| CSG Capability | M | | Enumerated {CSG capable, Not CSG capable, ...} | Indicates a CSG capable UE. |

TABLE 4

Registration Cause (Indicates if a UE registration is for an emergency call)

| Information Element/Group name | Presence | Range | Type and reference | Semantics description |
|---|---|---|---|---|
| Registration cause | | | Enumerated {emergency call, normal, ...} | |

Advantageously, the mobility management module 69 is operable to package the information identifying the mobile telephone's identity and capabilities, and the cause of the original registration (as set out in (b) to (d) above), in a manner which will be transparent to the core network 8, for example in a so called 'transparent container' such as modified version of the 'Source RNC to Target RNC transparent container' referred to in Section 9.2.1.28 of 3GPP TS 25.413 v 8.2.1 or a variation thereof (e.g. as illustrated in Table 5).

TABLE 5

Source RNC to Target RNC Transparent Container IE (Extract)

| IE/Group Name | Presence | Range | IE type and reference | Semantics description | Criticality | Assigned Criticality |
|---|---|---|---|---|---|---|
| RRC Container | M | | OCTET STRING | | — | |
| Number of Iu Instances | M | | INTEGER (1 ... 2) | | — | |
| ... | ... | ... | ... | ... | ... | ... |
| UE Identity | O | | x.x.x.x | | YES | Ignore |
| Registration Cause | O | | x.x.x.x | | YES | Ignore |
| UE Capabilities | O | | x.x.x.x | | YES | Ignore |
| ... | ... | ... | ... | ... | ... | ... |

It will be appreciated that the transparent container need not include all the information set out in (b) to (d) above, but may instead include a subset of the information. For example, the transparent container may not include information identifying the mobile telephone's identity. Further, only one of the identified types of information upon which a decision can be based on whether and/or how access control should be carried out may be included (or indeed additional/alternative information upon which such a decision may be included).

The mobility management module 69 is further operable to manage communication of the transfer message, once generated, to the source HNB-GW via the HNB-GW interface 55.

Each HNB-GW 15, when acting as a source HNB-GW is operable to receive transfer messages generated and communicated by the source HNB, via its HNB interface 103. The mobility management module 117 of each HNB-GW 15 (when operating as a source HNB-GW) is operable to manage the extraction of the relocation required message from the transfer message (complete with the transparent container carrying information (b) to (d) above) and the communication of the extracted relocation required message, via the core network 8 interface 105, to the core network 8.

The core network 8 is operable to receive the relocation required message, to generate a relocation request message based on the relocation required message, and to communicate the generated request message to the target HNB-GW. The relocation request message may be any suitable message, for example, a Radio Access Network Application Part (RANAP) RELOCATION REQUEST MESSAGE (e.g. as referred to in Section 9.1.10 of 3GPP TS 25.413 v. 8.2.1 or variation thereof) including: the transparent container carrying information identifying the mobile telephone's identity and capabilities, and the cause of the original registration; and the information identifying the target cell (e.g. Target CELL ID).

Each HNB-GW 15 is operable (when operating as a target HNB-GW) to receive a relocation request message communicated to it by the core network 8, via the core network interface 105. The mobility management module 117 of the HNB-GW (when operating as a target HNB-GW) is operable to manage the extraction of the mobile telephone's identity and capabilities, and the cause of the original registration from the transparent container carried by the relocation request message.

The mobility management module 117 of each HNB-GW 15 (when operating as a target HNB-GW) is further operable to manage generation of a RUA connection message for establishing a signalling connection with and for transporting the relocation request message to the target HNB (e.g. a RUA CONNECT MESSAGE as referred to in Section 9.1.3 of 3GPP TS 25.468 v. 8.1.0 or variation thereof—Table 6).

TABLE 6

RUA CONNECT (sent to establish a connection and carry a RANAP message)

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| CN Domain ID | M | | 9.2.6 | | YES | reject |
| Context ID | M | | 9.2.2 | | YES | reject |
| Intra Domain NAS Node Selector | O | | 9.2.4 | | YES | ignore |
| Establishment Cause | M | | 9.2.3 | | YES | reject |
| RANAP Message | M | | 9.2.5 | | YES | reject |

Each HNB is operable (when operating as a target HNB) to receive the RUA connection message via the HNB-GW interface 55. The mobility management module 69 of the target HNB is operable to manage the extraction of the relocation request message from the received RUA connection message, and extraction of the mobile telephone's identity and capabilities, and the cause of the original registration from the transparent container.

The mobility management modules 69, 117 of the target HNB and the target HNB gateway are further operable to manage completion of relocation of the mobile telephone including: determining the nature of any access control to be carried out by the target (new source) HNB-GW and/or target (new source) HNB based on the information identifying the mobile telephone's capabilities (and in particular its CSG capability) and/or the cause of the original call (and in particular if the call is an emergency call or not); and carrying out such access control if required.

Thus, according to this implementation after relocation from a source HNB 11 to a target HNB 11, information (e.g. UE Capability, Registration Cause and UE Identity) available at the source HNB 11 is advantageously made available both at the target HNB 11 and the target HNB-GW 15. Making the capability information available allows the new HNB-GW 15 to determine whether and/or how access control should be carried out based on whether or not the mobile telephone is CSG capable and/or whether or not the mobile telephone is a pre-release 8 telephone. Making the registration cause available allows the new HNB-GW 15 to determine whether and/or how access control should be carried out based on whether or not the on-going call is an emergency call. Making the identity information available ensures that after relocation the UE identity is maintained at the HNB-GW in the form originally used to identify the phone on registration and accordingly ensures that the UE identity as linked to the original context is not lost.

Introducing the information into the 'Source RNC to Target RNC Transparent Container' in the 'RANAP RELOCATION REQUIRED' message also beneficially reduces the signalling required to provide the information to the target HNB-GW (compared, for example, to the following implementation).

Figure 7:
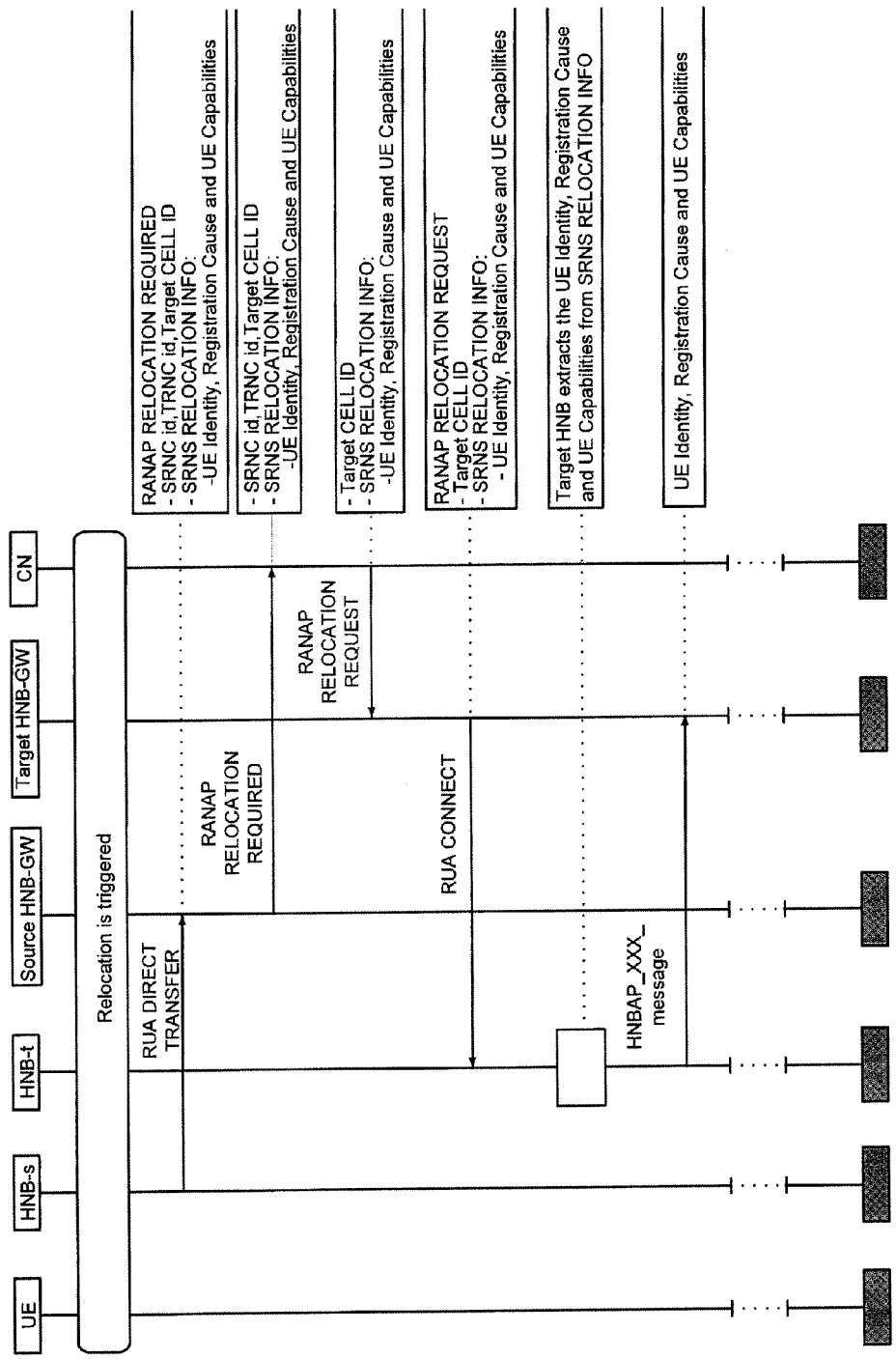
FIG. 7 is a timing diagram illustrating a relocation procedure carried out by another exemplary implementation of the system of FIG. 1.
Figure 8:
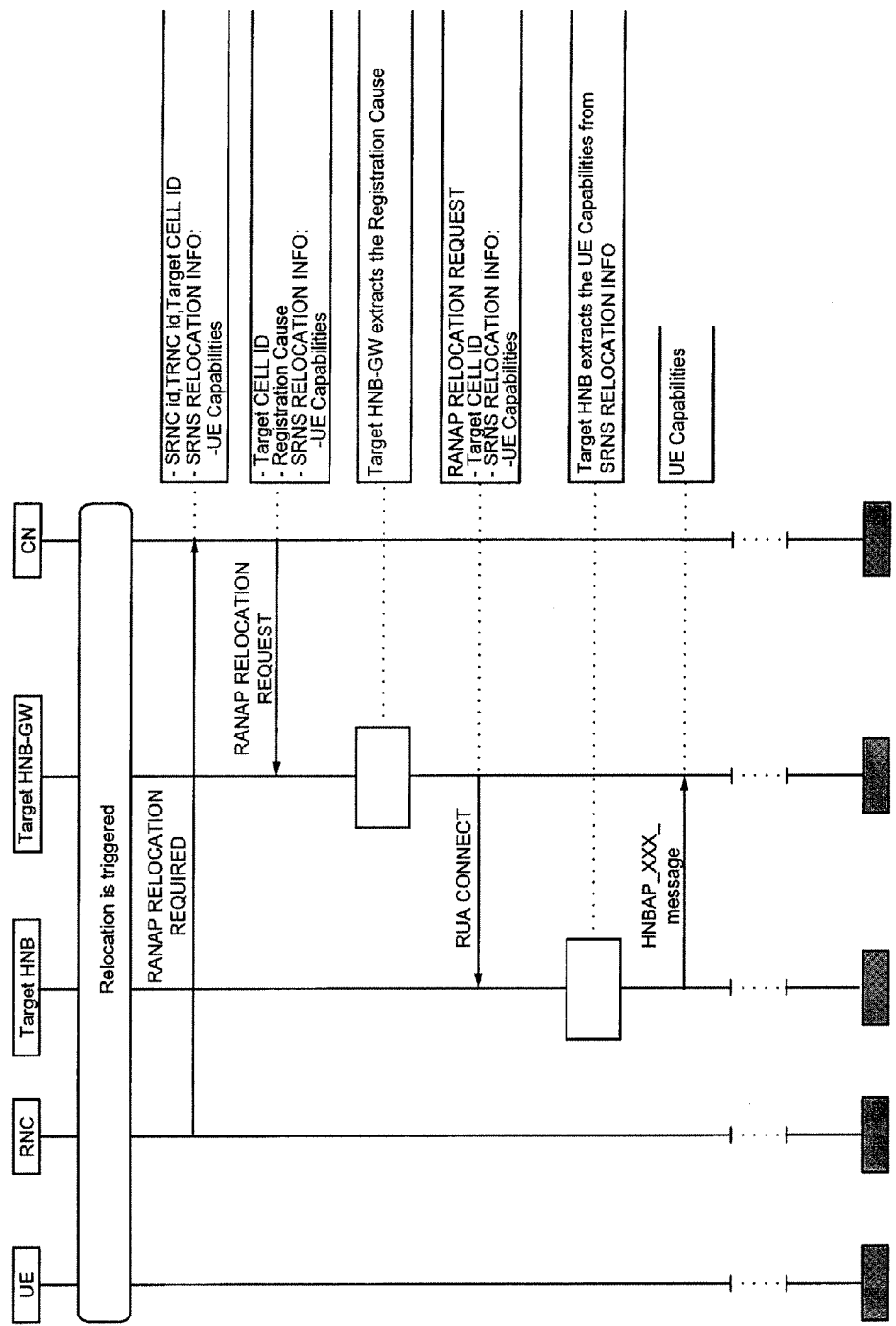
FIG. 8 is a timing diagram illustrating a relocation procedure carried out by yet another exemplary implementation of the system of FIG. 1.

(2) Femto-to-Femto Relocation—use of a SERVING RADIO NETWORK SUBSYSTEM (SRNS) RELOCATION INFO Message FIG. 7, illustrates the operation of another exemplary implementation of the telecommunication system 1 of FIG. 1 during inter-HNB-GW relocation.

In accordance with the implementation shown in FIG. 7, mobility management module 69 of each HNB 11 (when operating as a source HNB) is operable, when relocation is triggered, to manage generation of a message for transferring a relocation required message to the source HNB-GW in a similar manner to that of the implementation shown in FIG. 6.

Like the implementation of FIG. 6, the mobility management module 69 is advantageously operable to manage generation of a RANAP User Adaptation (RUA) message (for example, a RUA DIRECT TRANSFER message as referred to in Section 9.1.4 of 3GPP TS 25.468 v. 8.1.0 or variation thereof—see Table 1) for transporting a Radio Access Network Application Part (RANAP) RELOCATION REQUIRED MESSAGE (e.g. as referred to in Section 9.1.9 of 3GPP TS 25.413 v. 8.2.1 or variation thereof) or the like to the HNB-GW 15.

The mobility management module 69 is configured to include a plurality of information elements (IE) and/or IE groups in the relocation required message including:

(a) information identifying the source and target RNCs (respectively part of the source and target HNBs in the described implementations) and the target cell (e.g. SRNC id, TRNC id and Target CELL ID);

(b) information identifying the mobile telephone's identity (e.g. its International Mobile Subscriber Identity (IMSI), a Temporary Mobile Subscriber Identity (TMSI), a Packet Temporary Mobile Subscriber Identity (P-TMSI), and/or the like) (e.g. the IE/IF Group 'UE Identity' referred to in Section 9.2.17 of 3GPP TS 25.469 v 8.1.0 or a variation thereof—see Table 2);

(c) information identifying the mobile telephone's capabilities (e.g. its access stratum release indicator and/or its closed subscriber group capabilities) (e.g. the IE/IE Group 'UE Capabilities' referred to in Section 9.2.24 of 3GPP TS 25.469 v 8.1.0 or a variation thereof—see Table 3); and (d) and information identifying the reason for registration to the HNB (e.g. whether the call is an emergency call or not) (e.g. the IE/IE Group 'Registration Cause' referred to in Section 9.2.21 of 3GPP TS 25.469 v 8.1.0 or a variation thereof—see Table 4).

The information identifying the mobile telephone's capabilities and the information identifying the reason for the original registration each constitute information based upon which a HNB-GW 15 can determine whether and/or how access control should be carried out for the identified mobile telephone.

Unlike the implementation of FIG. 6, however, the mobility management module 69 is operable to manage encoding of the information identifying the mobile telephone's identity and capabilities, and the cause of the original registration, into a radio resource control (RRC) message (for example using the RRC encoding functionality of the radio resource management module 67) suitable for carrying relocation information, for example, a modified version of the 'SERVING RADIO NETWORK SUBSYSTEM (SRNS) RELOCATION INFO' message referred to in Section 14.12.4.2 of 3GPP TS 25.331 version 8.6.0 or a variation thereof.

It will be appreciated that the RRC relocation information message need not include all the information set out in (b) to (d) above, but may instead include a subset of the information. For example, the relocation information message may not include information identifying the mobile telephone's identity. Further, only one of the identified types of information upon which a decision can be based on whether and/or how access control should be carried out may be included (or indeed additional/alternative information upon which such a decision can be based may be included).

The mobility management module 69 is further operable to manage communication of the transfer message, once generated, to the source HNB-GW via the HNB-GW interface 55.

Each HNB-GW 15, when acting as a source HNB-GW is operable to receive transfer messages generated and communicated by the source HNB, via its HNB interface 103. The mobility management module 117 of each HNB-GW 15 (when operating as a source HNB-GW) is operable to manage the extraction of the relocation required message from the transfer message (complete with the relocation information message encoding information (b) to (d) above) and the communication of the extracted relocation required message, via the core network interface 105, to the core network 8.

The core network 8 is operable to receive the relocation required message, to generate a relocation request message based on the relocation required message, and to communicate the generated request message to the target HNB-GW 15. The relocation request message may be any suitable message, for example, a Radio Access Network Application Part (RANAP) RELOCATION REQUEST MESSAGE (e.g. as referred to in Section 9.1.10 of 3GPP TS 25.413 v. 8.2.1 or variation thereof) including: the relocation information message carrying information identifying the mobile telephone's identity and capabilities, and the cause of the original registration; and the information identifying the target cell (e.g. Target CELL ID).

Each HNB-GW 15 is operable (when operating as a target HNB-GW) to receive a relocation request message communicated to it by the core network 8 via the core network interface 105. However, HNB-GWs 15 not generally provided with a RRC decoder and are not, therefore, generally able to decode RRC messages such as the (RRC) relocation information message. Accordingly, the target HNB-GW 15 in this general case will be unable to extract the mobile telephone's identity and capabilities, and the cause of the original registration directly from the relocation information message carried by the relocation request message.

The mobility management module 117 of each HNB-GW 15 (when operating as a target HNB-GW) is further operable to generate a RUA connection message for establishing a signalling connection with, and to transport the relocation request message to, the target HNB (e.g. a RUA CONNECT MESSAGE as referred to in Section 9.1.3 of 3GPP TS 25.468 v. 8.1.0 or variation thereof—Table 6).

Each HNB 11 is operable (when operating as a target HNB) to receive the RUA connection message via the HNB-GW interface 55. The mobility management module 69 of the target HNB is operable to manage the extraction of the relocation request message from the received RUA connection message, and decoding of the mobile telephone's identity and capabilities, and the cause of the original registration from the RRC relocation information message carried by the relocation request message (for example, using the RRC decoding functionality provided by the radio resource management module 67).

The mobility management module 69 is further operable to manage the generation of a message for transporting the extracted information identifying the mobile telephone's identity and capabilities, and information identifying the cause of the original registration back to the target HNB-GW 15 and for managing subsequent communication of the generated message to the target HNB-GW 15. The message may be any message suitable for interpretation by the target HNB-GW 15, for example, a dedicated HNB application part (HNBAP) protocol message, or a version of an existing message.

The mobility management modules 69, 117 of the target HNB 11 and the target HNB gateway 15 are further operable to manage completion of relocation of the mobile telephone including: determining the nature of any access control to be carried out by the target (new source) HNB-GW and/or target (new source) HNB based on the information identifying the mobile telephone's capabilities (and in particular its CSG capability) and/or the cause of the original call (and in particular if the call is an emergency call or not); and carrying out such access control if required.

Thus, according to this implementation after relocation from a source HNB 11 to a target HNB 11, information (e.g. UE Capability, Registration Cause and UE Identity) available at the source HNB 11 is advantageously made available both at the target HNB 11 and the target HNB-GW 15. Making the capability information available allows the new HNB-GW 15 to determine whether and/or how access control should be carried out based on whether or not the mobile telephone is CSG capable and/or whether or not the mobile telephone is a pre-release 8 telephone. Making the registration cause available allows the new HNB-GW 15 to determine whether and/or how access control should be carried out based on whether or not the on-going call is an emergency call. Making the identity information available ensures that after relocation the UE identity is maintained at the HNB-GW in the form originally used to identify the phone on registration and accordingly ensures that the UE identity as linked to the original context is not lost.

Introducing the information into the 'SRNS RELOCATION INFO' message in the 'RANAP RELOCATION REQUIRED' message also beneficially makes use of existing signalling resources to provide the information to the target HNB 11 and HNB-GW 15.

(3) Macro-to-Femto Relocation—Using Updated RNCs

In the case of a relocation from a macro cell to a femto cell the mobility management module 85 of the RNC 7 (when the base station 5 is operating as the source node) does not need to generate a RUA DIRECT TRANSFER message for transporting a relocation required message to a source HNB-GW 15). Accordingly, the mobility management module 85 is operable, when relocation is triggered, to manage generation of a relocation required message (e.g. a Radio Access Network Application Part (RANAP) RELOCATION REQUIRED MESSAGE as referred to in Section 9.1.9 of 3GPP TS 25.413 v. 8.2.1 or variation thereof), and for managing communication of the generated message directly to the core network 8 via the network interface 75.

The mobility management module 85 of the RNC 7 is operable to include the same or similar information in the relocation required message as described with reference to FIGS. 6 and 7, i.e. including:

(a) information identifying the source and target RNCs (respectively part of the source and target HNBs in the described implementations) and the target cell (e.g. SRNC id, TRNC id and Target CELL ID);

(b) information identifying the mobile telephone's identity (e.g. its International Mobile Subscriber Identity (IMSI), a Temporary Mobile Subscriber Identity (TMSI), a Packet Temporary Mobile Subscriber Identity (P-TMSI), and/or the like) (e.g. the IE/IE Group 'TIE Identity' referred to in Section 9.2.17 of 3GPP TS 25.469 v 8.1.0 or a variation thereof—see Table 2);

(c) information identifying the mobile telephone's capabilities (e.g. its access stratum release indicator and/or its closed subscriber group capabilities) (e.g. the IE/IE Group 'UE Capabilities' referred to in Section 9.2.24 of 3GPP TS 25.469 v 8.1.0 or a variation thereof—see Table 3); and (d) and information identifying the reason for registration to the HNB (e.g. whether the call is an emergency call or not) (e.g. the IE/LE Group 'Registration Cause' referred to in Section 9.2.21 of 3GPP TS 25.469 v 8.1.0 or a variation thereof—see Table 4).

The mobility management module 85 may manage the packaging of this information in a transparent container (for example as described with reference to FIG. 6) or the encoding of the information in a RRC relocation information message (for example as described with reference to FIG. 7).

The core network is operable 8 to receive the relocation required message, to generate a relocation request message based on the relocation required message (e.g. a RANAP RELOCATION REQUEST MESSAGE), and to communicate the generated relocation request message to the target HNB-GW 15. The core network 8 is operable, when generating the relocation required message, to include: either the transparent container (according to FIG. 6), or the relocation information message (according to FIG. 7), carrying information identifying the mobile telephone's identity and capabilities, and the cause of the original registration; and the information identifying the target cell (e.g. Target CELL ID).

The core network 8, the target HNB-GW 15 and the target HNB 11 are operable to then follow the remainder of the process as described with reference to FIG. 6 (if the information is carried in the transparent container), or as described with reference FIG. 7 (if the information is carried in the RRC relocation information message).

(4) Macro-to-Femto Relocation—Older RNCs

In the case of older (e.g. release 8) RNCs, however, these are generally only be able to include the IE/IE groups specified in the release 8 standards, in the relocation required message, and are unable to send all information described with reference to FIGS. 6 and 7. FIG. 8, illustrates the operation of an exemplary implementation of the telecommunication system 1 of FIG. 1 which aims to ameliorate this situation.

The mobility management module 85 is operable to include a plurality of (release 8) information elements (IE) and/or IE groups in the relocation required message including:

(a) information identifying the source and target RNCs (respectively part of the source and target HNBs in the described implementations) and the target cell (e.g. SRNC id, TRNC id and Target CELL ID);

(b) information identifying the mobile telephone's capabilities (e.g. its closed subscriber group capabilities) (e.g. using the optional 'Support of CSG' IE in the IE/IE Group 'UE radio access capability' referred to in Section 10.3.3.42 of 3GPP TS 25.331 v 8.6.0 or a variation thereof).

The mobility management module 85 of the RNC 7 is further operable to manage encoding of the information identifying the mobile telephone's capabilities into a radio resource control (RRC) message (for example using the RRC encoding functionality of the radio resource management module 83) suitable for carrying relocation information, for example, in the 'SERVING RADIO NETWORK SUBSYSTEM (SRNS) RELOCATION INFO' message referred to in Section 14.12.4.2 of 3GPP TS 25.331 version 8.6.0 or a variation thereof.

The core network is operable 8 to receive the relocation required message, to generate a relocation request message based on the relocation required message (e.g. a RANAP RELOCATION REQUEST MESSAGE), and to communicate the generated relocation request message to the target HNB-GW. The core network 8 is operable, when generating the relocation request message, to include information identifying the cause of the original registration (e.g. to identify if the call is an emergency call) in addition to the information identifying the target cell (e.g. Target CELL ID), and the RRC relocation information message carrying the information identifying the mobile telephone's capabilities. As a skilled person will appreciate, in the case of a RANAP RELOCATION REQUEST MESSAGE, information identifying the mobile telephone 3 will also be included in the relocation request message in the form of the International Mobile Subscriber Identity (IMSI) (e.g. in the 'Permanent NAS UE Identity' information element).

Each HNB-GW 15 is operable (when operating as a target HNB-GW) to receive a relocation request message communicated to it by the core network 8, via the core network interface 105. However, as described previously, HNB-GWs 15 are not generally provided with a RRC decoder and are not, therefore, generally suitable for decoding RRC messages (such as the RRC relocation information message). Hence, the target HNB-GW 15 is unable to extract the mobile telephone's capabilities, directly from the RRC relocation information message carried by the relocation request message. However, in this implementation, the information identifying the cause of the original registration does not form part of the RRC relocation information message. Accordingly the mobility management module 85 of the RNC is operable to manage extraction of the registration cause directly from the relocation request message.

The mobility management module 117 of each HNB-GW 15 (when operating as a target HNB-GW) is further operable to generate a RUA connection message for establishing a signalling connection with, and to transport the relocation request message to, the target HNB 11 (e.g. a RUA CONNECT MESSAGE as referred to in Section 9.1.3 of 3GPP TS 25.468 v. 8.1.0 or variation thereof—Table 6).

Each HNB 11 is operable (when operating as a target HNB) to receive the RUA connection message via the HNB-GW interface 55. The mobility management module 69 of the target HNB 11 is operable to manage the extraction of the relocation request message from the received RUA connection message, and to manage decoding of the mobile telephone's capabilities from the RRC relocation information message carried by the relocation request message (for example, using the RRC decoding functionality provided by the radio resource management module 67).

The mobility management module 69 is further operable to manage the generation of a message for transporting the extracted information identifying the mobile telephone's capabilities back to the target HNB-GW 15 and for managing subsequent communication of the generated message to the target HNB-GW 15. The message may be any message suitable for interpretation by the target HNB-GW 15, for example, a dedicated HNB application part (HNBAP) protocol message, or a version of an existing message.

The mobility management modules 69, 117 of the target HNB 11 and the target HNB gateway 15 are further operable to manage completion of relocation of the mobile telephone 3 including: determining the nature of any access control to be carried out by the target (new source) HNB-GW 15 and/or target (new source) HNB 11 based on the information identifying the mobile telephone's capabilities (and in particular its CSG capability) and/or the cause of the original call (and in particular if the call is an emergency call or not); and carrying out such access control if required.

Thus, according to this implementation after relocation from a macro cell to the target cell of a target HNB 11, information (e.g. UE Capability and Registration Cause) is advantageously made available both at the target HNB 11 and the target HNB-GW 15 despite the macro cell having an older (e.g. release 8) RNC. Making the capability information available allows the new HNB-GW 15 to determine whether and/or how access control should be carried out based on, for example, whether or not the mobile telephone is CSG capable and/or whether or not the mobile telephone is a pre-release 8 telephone. Making the registration cause available allows the new HNB-GW 15 to determine whether and/or how access control should be carried out based on whether or not the on-going call is an emergency call.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone, the RNC, the HNB and the HNB-GW each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled four and may be supplied to the RNC, HNB, HNB-GW or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction

In Rel-8, during UE registration, the IEs—UE Capabilities and Registration cause are sent to HNB-GW. In Rel'9, during Relocation procedure from a HNB to another HNB or from Macro to HNB, these parameters (UE Capability and Registration Cause) available/known at source HNB or Macro network must be made available at Target HNB.

These IEs are kept in Source HNB or RNC for the duration of call and hence after relocation, these IEs should be made available at Target HNB-GW and Target HNB.

2. Discussion

Need of these Parameters at Target HNB/HNB-GW after Relocation

These parameters are available at Source HNB/HNB-GW or Macro network. So after relocation Target HNB/HNB-GW should also have these parameters.

UE Capabilities

Consider the case where a CSG UE is completely relocated to Target HNB/HNB-GW. After that if the UE is performing an Intra HNB-GW relocation, current Source HNB-GW does not know whether to perform Access Control or not, because HNB-GW does not know whether UE is CSG or non CSG UE because UE Capabilities is not available at HNB-GW. So "UE Capabilities" must be present.

Registration Cause

Consider the same case as above (UE Capabilities). The new source HNB-GW must not perform Access Control for non CSG UE if the Registration Cause is Emergency call in subsequent relocation. So "Registration Cause" must be present.

These IEs shall be introduced in Source RNC to Target RNC Transparent Container in the RANAP RELOCATION REQUIRED message as below:

TABLE 7

| Source RNC to Target RNC Transparent Container IE | | | | | | |
|---|---|---|---|---|---|---|
| IE/Group Name | Presence | Range | IE type and reference | Semantics description | Criticality | Assigned Criticality |
| RRC Container | M | | OCTET STRING | | — | |
| Number of Iu Instances | M | | INTEGER (1 ... 2) | | — | |
| ... | ... | ... | ... | ... | ... | ... |
| Registration Cause | O | | x.x.x.x | | YES | ignore |
| UE Capabilities | O | | x.x.x.x | | YES | ignore |
| ... | ... | ... | ... | ... | ... | ... |

Proposal: Add the parameter—Registration Cause and UE Capabilities in Source RNC to Target RNC Transparent Container 3. Proposal Proposal: Add the parameter—Registration Cause and UE Capabilities in Source RNC to Target RNC Transparent Container 4. Reference

[1] 3GPP TS 25.469 HNBAP Protocol Specification

Further Implementations

Femto to Femto Relocation

During Relocation procedure from a HNB to another HNB, parameters (UE Capability, Registration Cause and UE Identity) available at source HNB must be made available at Target HNB. These IEs are kept in Source HNB for the duration of call and hence after relocation, these IEs should be made available at Target HNB-GW and Target HNB.

Need of these Parameters at Target HNB/HNB-GW

These parameters are available at Source HNB/HNB-GW. So after relocation Target HNB/HNB-GW should also have these parameters.

UE Identity

IMSI is already an IE in RANAP RELOCATION REQUEST. But the HNBAP standard says UE Identity can be IMSI or TMSI/P-TMSI or IMEI etc. Whatever UE Identity stored in Source HNB should be available at the Target HNB after relocation. So Source HNB should encode the whatever UE Identity available and linked to the Context, regardless of CN sending IMSI in RANAP Relocation Request Registration Cause Consider the same case as above (UE Capabilities). The new source HNB-GW must not perform Access Control for non CSG UE if the Registration Cause is Emergency call in subsequent relocation. So "Registration Cause" must be present.

UE Capabilities

Consider the case where a CSG UE is completely relocated to Target HNB/HNB-GW. After that if the UE is performing an Intra HNB-GW relocation, current Source HNB-GW does not know whether to perform Access Control or not, because HNB-GW does not know whether UE is CSG or non CSG UE because UE Capabilities is not available at HNB-GW. So "UE Capabilities" must be present.

These IEs shall be introduced in Source RNC to Target RNC Transparent Container in the RANAP RELOCATION REQUIRED message.

Proposal 1: Add the parameter—UE Identity, Registration Cause and UE Capabilities in Source RNC to Target RNC Transparent Container These information can also be derived from SRNS RELOCATION INFO. But the HNB-GW does not have RRC decoder. So HNB-GW can not get these IEs. If these IEs are not included as suggested in IU interface, then HNB need to decode the SRNS RELOCATION INFO and retrieve the IEs—UE Identity, Registration Cause, UE Capabilities and HNB has to sends these IEs to HNB-GW via a HNBAP message.

Proposal 2a: Add the parameter—UE Identity, Registration Cause and UE Capabilities in SRNS RELOCATION INFO Proposal 2b: HNB shall decode the SRNS RELOCATION INFO and send the parameters—UE Identity, Registration Cause and UE Capabilities to HNB-GW via HNBAP message Macro to Femto Relocation In case of inbound mobility also such handling must be performed. RNC can be Rel'9 RNC or Rel'8 RNC.

If the RNC is Rel'9 RNC, then RNC can send those parameters either in Source RNC to Target RNC Transparent Container or in SRNS RELOCATION INFO. The impact is same as in case of Femto to Femto relocation.

But if the RNC is Rel'8 RNC, then it means RNC can not send any of these parameters. So CN should send the parameter—Registration Cause to HNB-GW in RANAP RELOCATION REQUEST message. There is no need of UE Identity as IMSI in RANAP RELOCATION REQUEST is sufficient. Also UE Capabilities should be decoded by HNB and send to HNB-GW via HNBAP message.

Proposal 3a: Add the parameter—Registration Cause in RANAP RELOCATION REQUEST

Proposal 3b: HNB shall decode the SRNS RELOCATION INFO and send the parameter-UE Capabilities to HNB-GW via HNBAP message This application is based upon and claims the benefit of priority from United Kingdom patent application No. 0906818.0, filed on Apr. 20, 2009, the disclosure of which is incorporated herein in its entirety by reference.

The invention claimed is:

1. A method performed by a gateway device via which a target home base station is connected in a communication network, the method comprising:

receiving a relocation request message indicating that a relocation of a mobile communication device to the

TABLE 8

Source RNC to Target RNC Transparent Container IE

| IE/Group Name | Presence | Range | IE type and reference | Semantics description | Criticality | Assigned Criticality |
|---|---|---|---|---|---|---|
| RRC Container | M | | OCTET STRING | — | | |
| Number of Iu Instances | M | | INTEGER (1 . . . 2) | — | | |
| . . . | . . . | . . . | . . . | . . . | . . . | . . . |
| UE Identity | O | | x.x.x.x | | YES | ignore |
| Registration Cause | O | | x.x.x.x | | YES | ignore |
| UE Capabilities | O | | x.x.x.x | | YES | ignore |
| . . . | . . . | . . . | . . . | . . . | . . . | . . . | target home base station has been triggered, said relocation request message including, in an encoded form, at least one of:
- (a) information identifying a capability of the mobile communication device to support membership of a closed subscriber group (CSG); and
- (b) information identifying a cause of registration of the mobile communication device in the communication network;

communicating said relocation request message to the target home base station;

receiving, from said target home base station, a reply message including, in a form extractable by the gateway device, said at least one of:
- (a) information identifying the capability of the mobile communication device to support membership of the closed subscriber group (CSG); and
- (b) information identifying the cause of registration of the mobile communication device in the communication network;

extracting, from said reply message, said at least one of:
- (a) information identifying the capability of the mobile communication device to support membership of the closed subscriber group (CSG); and
- (b) information identifying the cause of registration of the mobile communication device in the communication network, and extracting, from said relocation request message, said information identifying the cause of registration of the mobile communication device in the communication network, wherein said relocation request message includes:
said information identifying the capability of the mobile communication device to support membership of the closed subscriber group (CSG) in an encoded form; and
said information identifying the cause of registration of the mobile communication device in the communication network in a form extractable by the target gateway device.

2. A method performed by a target home base station in a communication network, the method comprising:

receiving, from a target gateway device, a relocation request message indicating that a relocation of a mobile communication device to the target home base station has been triggered, said relocation request message including, in an encoded form, at least one of:
- (a) information identifying a capability of the mobile communication device to support membership of a closed subscriber group (CSG); and
- (b) information identifying a cause of registration of the mobile communication device in the communication network;

extracting, from said relocation request message, said encoded information;

generating a reply message including, in a form extractable by said target gateway device, said extracted information; and communicating said reply message to said target gateway device, wherein said relocation request message includes:
the information identifying the capability of the mobile communication device to support membership of the closed subscriber group (CSG) in an encoded form; and
the information identifying the cause of registration of the mobile communication device in the communication network in a form extractable by the target gateway device.

3. A gateway device for connection to by a home base station in a communication network, the gateway device comprising:

means for receiving a relocation request message indicating that a relocation of a mobile communication device to the target home base station has been triggered, said relocation request message including, in an encoded form, at least one of:
- (a) information identifying a capability of the mobile communication device to support membership of a closed subscriber group (CSG); and
- (b) information identifying a cause of registration of the mobile communication device in the communication network;

means for communicating said relocation request message to the target home base station;

means for receiving, from said target home base station, a reply message including, in a form extractable by the gateway device, said at least one of:
- (a) information identifying the capability of the mobile communication device to support membership of the closed subscriber group (CSG); and
- (b) information identifying the cause of registration of the mobile communication device in the communication network;

means for extracting, from said reply message, said at least one of:
- (a) information identifying the capability of the mobile communication device to support membership of the closed subscriber group (CSG); and
- (b) information identifying the cause of registration of the mobile communication device in the communication network; and means for extracting, from said relocation request message, said information identifying the cause of registration of the mobile communication device in the communication network, wherein said relocation request message includes:
said information identifying the capability of the mobile communication device to support membership of the closed subscriber group (CSG) in an encoded form; and
said information identifying the cause of registration of the mobile communication device in the communication network in a form extractable by the target gateway device.

4. A home base station for connection in a communication network, the home base station comprising:

means for receiving, from a target gateway device, a relocation request message indicating that a relocation of a mobile communication device to the home base station has been triggered, said relocation request message including, in an encoded form, at least one of:
- (a) information identifying a capability of the mobile communication device to support membership of a closed subscriber group (CSG); and
- (b) information identifying a cause of registration of the mobile communication device in the communication network;

means for extracting, from said relocation request message, said encoded information;

means for generating a reply message including, in a form extractable by said target gateway device, said extracted information; and
means for communicating said reply message to said target gateway device,
wherein said relocation request message includes:
  the information identifying the capability of the mobile communication device to support membership of the closed subscriber group (CSG) in an encoded form; and
  the information identifying the cause of registration of the mobile communication device in the communication network in a form extractable by the target gateway device.

* * * * *